No. 690,607. Patented Jan. 7, 1902.
J. M. RALSTON.
APPARATUS FOR TRANSPLANTING AND TRANSPORTING TREES.
(Application filed Feb. 13, 1901.)
(No Model.) 2 Sheets—Sheet I.
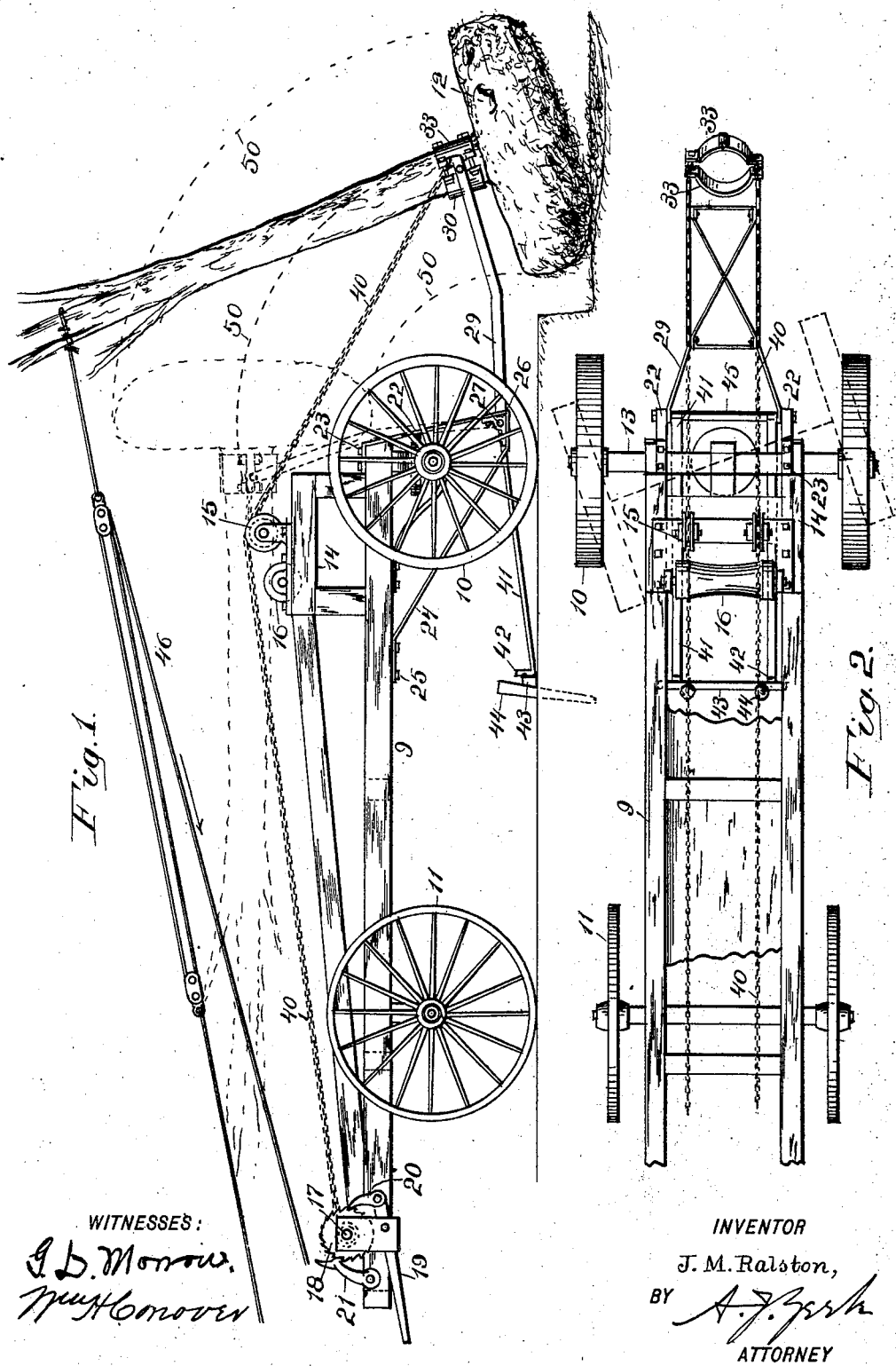
WITNESSES:
INVENTOR
J. M. Ralston,
BY
ATTORNEY No. 690,607. Patented Jan. 7, 1902.
J. M. RALSTON.
APPARATUS FOR TRANSPLANTING AND TRANSPORTING TREES.
(Application filed Feb. 13, 1901.)
(No Model.) 2 Sheets—Sheet 2.
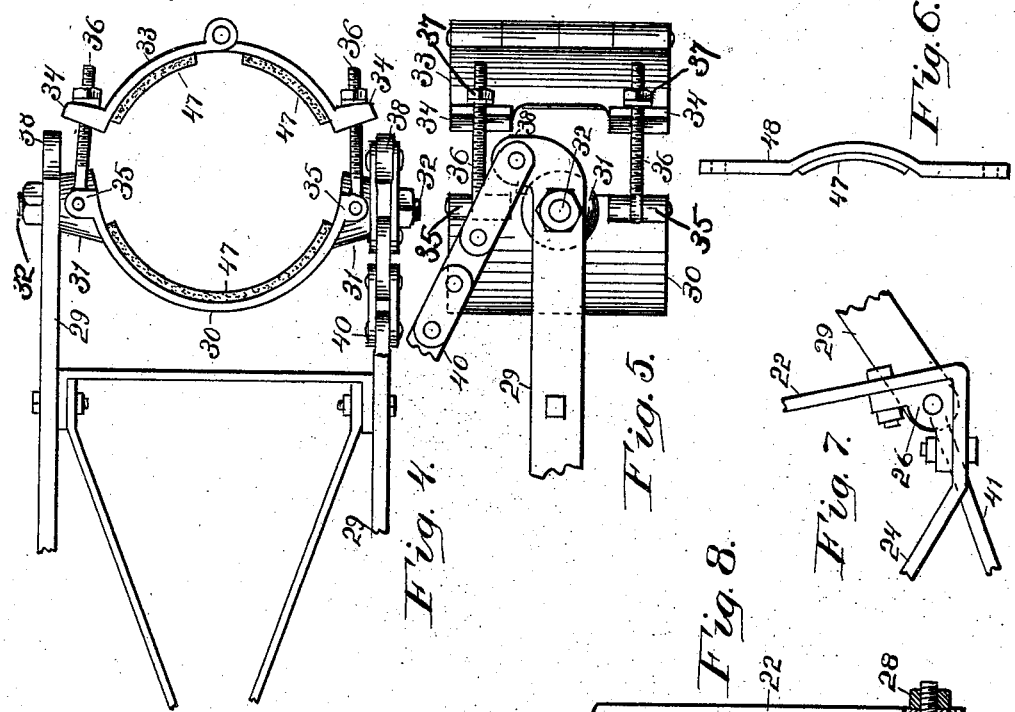
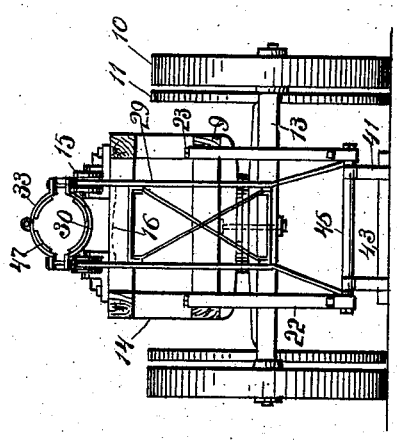
WITNESSES:
G. L. Morrow.
INVENTOR
J. M. Ralston,
BY
ATTORNEY

UNITED STATES PATENT OFFICE.

JAMES M. RALSTON, OF ALLENHURST, NEW JERSEY.

APPARATUS FOR TRANSPLANTING AND TRANSPORTING TREES.

SPECIFICATION forming part of Letters Patent No. 690,607, dated January 7, 1902.

Application filed February 13, 1901. Serial No. 47,181. (No model.)

*To all whom it may concern:*

Be it known that I, JAMES M. RALSTON, a citizen of the United States, and a resident of Allenhurst, in the county of Monmouth and State of New Jersey, have invented certain new and useful Improvements in Apparatus for Transplanting and Transporting Trees, of which the following is a specification.

The object of this invention is to provide an apparatus for transplanting and transporting trees; and it is especially adapted for handling large trees.

The invention consists of a vehicle which is so constructed that when it is brought within operative range of the tree to be transplanted it is anchored there, and when the tree is ready to be hoisted the saddle of the raising-frame is attached to the base of the tree, and block and tackle secured to the trunk at any convenient distance above, and as the lower end of the raising-frame is hinged to the vehicle at a point below the axle and near the surface of the ground the entire weight of the tree rides on the hinged frame and swings around to its position on the vehicle on the arc described by the outer end of the frame, thereby greatly reducing the power required to perform the operation and at the same time providing a more convenient and expeditious means of doing the work, as will now be set forth in detail.

In the accompanying drawings, Figure 1 is a side elevation of my improved tree-transplanter. Fig. 2 is a top or plan view. Fig. 3 is a view of the front end of the vehicle. Fig. 4 is a top view of the saddle and portion of the raising-frame; Fig. 5, a side view of the saddle; Fig. 6, a view of supplemental portion of a saddle; Fig. 7, a side view of the lower end of the raising-frame, anchor, and portion of the stationary frame to which same is attached; and Fig. 8 is a front view of the lower portion of the raising-frame and the crossbar, a portion of the parts being in cross-section.

In constructing my invention I provide a vehicle with a body 9 of suitable length, mounted on wheels fore and aft, the front wheels 10 of which are made sufficiently strong to sustain the required weight, and the distance between said wheels is greater, preferably, than between the rear wheels 11, the object being to provide ample space between them for the ball 12 of the tree to freely swing when in position on the vehicle. This is an important feature, as by the herein-described method of raising trees I am able to take up an abnormally-large body of earth with the tree, thus in a great measure making the transplanting of large trees practical, since their growth is not arrested, as is the case ordinarily where the fibrous roots are torn away. The front axle 13 is pivoted to the body in the usual way, and to this axle the draft-tongue is secured in such a manner that it can readily be removed during the operation of raising or lowering the tree.

At the forward end of the body 9 is a framework 14, on which is mounted a pair of grooved pulleys 15 and to the rear of said pulleys a roller 16. At the rear end of the body is a heavy cross-shaft 17, having at each end, preferably, a ratchet-wheel 18, and a lever 19, hinged to the housing in which the shaft is journaled, having at its inner end a pawl 20 in operative contact with the ratchet-wheel. The other side of the ratchet-wheel has a hooked pawl 21 in engagement therewith, so that it will hold the ratchet-wheel in its rotation to any point that it may be turned by the lever, and in like manner the hooked pawl may be released and employed in connection with the lever to lower the tree.

At the front end of the body is a stationary frame composed of two bars 22, secured at their upper ends to the longitudinal sills of the body by means of bolts 23. These bars extend downwardly to a point near the surface of the ground, where they are bent back horizontally a short distance, and then extend upwardly, as at 24, until they are brought into contact with the lower side of the sills, to which they are attached by bolts 25. At the lower angled portions of these bars I place castings 26, each provided with a transverse hole through which is placed a cross-roll 27, one end of which is threaded and provided with a nut 28.

The raising-frame is composed of a pair of bars 29, the lower ends of which are hinged to the cross-rod 27, the bars resting against the stationary frame-bars, and the opposite ends of said bars have a saddle hinged thereto. This saddle consists of a semicircular frame 30, of sufficient dimension to receive the largest-size tree, on each side of which saddle is a boss 31, and a bolt or stud 32 passes through the end of each bar 29 and into the boss. As a complement to this portion of the saddle is a semicircular portion composed of two hinged parts 33, each end of which has a pair of ears 34. The ends of the saddle 30 have ears 35, between which are hinged swinging bolts 36, which are threaded and provided with nuts 37, these bolts being adapted to swing between the ears 34, just described.

The extension of each bar 29 beyond its hinged point at 32 has a bent end 38, to which is secured one end of a chain 40, which extends back to the vehicle, passing over and resting within the grooved pulleys 15 and attached at their rear ends to the cross-shaft 17, so that the lever 19 will in its operation turn the shaft 17, and in so doing cause the chain to wrap around the shaft and swing upwardly the free ends of the bars 29, and thus raise the tree attached thereto. The cross-rod 27 has also attached thereto, alongside of the bars 29, the forward ends of bars 41, the rear ends of which rest on the ground and have right-angled bends 42. The right-angled bends of said bars rest against a suitable cross-bar 43, which is held in position by suitable stakes 44, the object being to transfer the rearward pull of the tree to the anchor instead of against the vehicle. A tube 45 is placed on the rod 27, with the ends abutting against the anchor-bars 41, so that the latter will be firmly held in position.

In practice a block and tackle, such as is shown at 46, Fig. 1, is employed to tilt the tree and loosen the roots after a suitable trench has been dug around the roots, and this tackle is also employed in a measure to aid in bringing the trunk of the tree to its horizontal position on the vehicle; but the important feature is to swing the ball of the tree clear of the excavation and to swing it up on the arc described by the outer end of the frame, as shown by the dotted lines 50 in Fig. 1, and this is done principally by the lever 19 and the chain which has been described.

It will be observed that the saddle has cushions 47 on its inner surface, made of any suitable material, so that when the saddle is firmly clamped the trunk of the tree will not be disfigured by the great pressure exerted. In Fig. 6 I show a supplemental piece 48, which may be used instead of the hinged piece 33 when applied to trees of small diameter.

What I claim as new is—

1. An apparatus for transplanting trees comprising a vehicle having on the forward end thereof a stationary frame which extends to a point near the surface of the ground, in combination with a raising-frame hinged at one end to the lower end of said stationary frame, and having a saddle and gripping appliances for attaching the same to the body of a tree and means on said vehicle for swinging up the raising-frame, as set forth.

2. An apparatus for transplanting trees, comprising a vehicle having on its forward end a depending frame of two bars, each U-shaped in structure extending below the front axle to permit said axle to swivel in the usual manner, in combination with a cross-rod connecting the lower ends of said frame, a raising-frame hinged to said rod and having on its outer end a saddle and means for attaching same to the body of a tree, chains attached to the end of said frame, and means on the vehicle for swinging up the raising-frame, as set forth.

3. An apparatus for transplanting trees, comprising a vehicle, having on its forward end a depending frame of two bars, each U-shaped in structure, extending below the front axle, in combination with a cross-rod connecting the lower ends of said frames, a pair of anchors hinged to said cross-bar, and extending rearwardly, and a raising-frame also hinged to said cross-rod and extending forwardly, and means on said vehicle for swinging said frame upwardly, as set forth.

4. An apparatus for transplanting trees comprising a vehicle having on its forward end a stationary frame which extends downwardly, in combination with a raising-frame hinged to the lower end of said stationary frame, a saddle on the outer end of said raising-frame hinged to the lower end of said stationary frame, a saddle on the outer end of said raising-frame, and means for attaching same to a tree, a pair of grooved pulleys on the forward end of the vehicle, a cross-roller shaft on the rear end of the vehicle and levers and pawls for rotating the same, and chains from said roller-shaft extending over said grooved pulleys and secured to the end of the raising-frame, as set forth.

5. An apparatus for transplanting trees, comprising a vehicle having on its forward end a depending stationary frame, in combination with a raising-frame hinged thereto and having at its outer end a saddle and means for clamping the same to the body of a tree, a pair of grooved pulleys on the forward end of the vehicle, and a cross-roller on said frame behind said grooved pulleys, a cross-roller shaft on the rear end of the vehicle and levers and pawls for operating the same, and chains from said roller-shaft passing over the grooved pulleys and secured to the end of the raising-frame, as set forth.

6. In an apparatus for transplanting trees a saddle and means for clamping the body of a tree, comprising a semicircular portion having at each end a pair of ears and threaded bolts hinged thereto, a boss projecting out from each end between the ears, a curved portion also provided with ears for receiving the aforesaid bolts, and cushions on the inner surfaces of the curved portions, substantially as set forth.

7. In an apparatus for transplanting trees, a saddle comprising a curved portion, having at each end a pair of ears and one end of a threaded bolt hinged thereto, a boss projecting out between each of the pairs of ears in combination with a curved portion having projecting ears and adapted to receive the bolts, a raising-frame hinged to said saddle by means of bolts through the bosses on the saddle, as and for the purposes set forth.

Signed at Allenhurst, in the county of Monmouth and State of New Jersey, this 7th day of February, A. D. 1901.

JAMES M. RALSTON.

Witnesses:
G. D. MORROW,
WM. H. CONOVER.